US008656159B1

(12) United States Patent
Donahue

(10) Patent No.: US 8,656,159 B1
(45) Date of Patent: Feb. 18, 2014

(54) VERSIONING OF MODIFIABLE ENCRYPTED DOCUMENTS

(75) Inventor: James Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1262 days.

(21) Appl. No.: 11/871,003

(22) Filed: Oct. 11, 2007

(51) Int. Cl.
*H04L 29/06* (2006.01)

(52) U.S. Cl.
USPC ........... 713/165; 713/164; 713/166; 713/167; 726/27; 726/28; 726/29; 726/30; 709/217; 709/223; 709/224; 380/277; 380/278; 380/279; 380/280; 380/281; 380/282; 380/283; 380/284; 380/285; 380/286

(58) Field of Classification Search
USPC .............. 713/164–167, 189–193; 726/27–30; 709/217, 223–224; 380/277–286
See application file for complete search history.

(56) References Cited

U.S. PATENT DOCUMENTS

| 6,549,916 | B1 * | 4/2003 | Sedlar .................................. 1/1 |
| 7,565,419 | B1 * | 7/2009 | Kwiatkowski et al. ....... 709/223 |
| 2005/0097441 | A1 * | 5/2005 | Herbach et al. ............ 715/501.1 |
| 2005/0262432 | A1 * | 11/2005 | Wagner ........................ 715/511 |
| 2006/0004792 | A1 * | 1/2006 | Lyle et al. ..................... 707/100 |
| 2008/0002830 | A1 * | 1/2008 | Cherkasov et al. ........... 380/277 |
| 2009/0019549 | A1 * | 1/2009 | Reid .............................. 726/27 |

* cited by examiner

*Primary Examiner* — David Pearson
*Assistant Examiner* — Josnel Jeudy
(74) *Attorney, Agent, or Firm* — Schwegman Lundberg & Woessner, P.A.

(57) ABSTRACT

In some embodiments, a method includes receiving a modifiable electronic document. The method includes generating a new version of the modifiable electronic document. The method also includes encrypting the new version of the modifiable electronic document using an encryption key that is used to encrypt the modifiable electronic document and different versions of the modifiable electronic document. The method includes saving the new version of the modifiable electronic document.

22 Claims, 7 Drawing Sheets

VERSIONING OF MODIFIABLE ENCRYPTED DOCUMENTS

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright© 2007, Adobe Systems Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Electronic documents may be protected. An electronic document may be accessible by use of a communications network (such as the Internet). The accessibility may be controlled, such as by controlling the capability to open, edit, save and/or print the electronic document, for example. Access to an electronic document may be controlled by applying a document control policy to the electronic document. A policy may comprise a set of document control rules that may define rights associated with an electronic document. The rights may include rights granted to particular users, such as the right to access, edit, save and/or print the electronic document. Additionally, the set of document control rules may include a list of users that may be granted the rights, and/or may include a set of restrictions on how and/or when one or more rules may apply to an electronic document.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
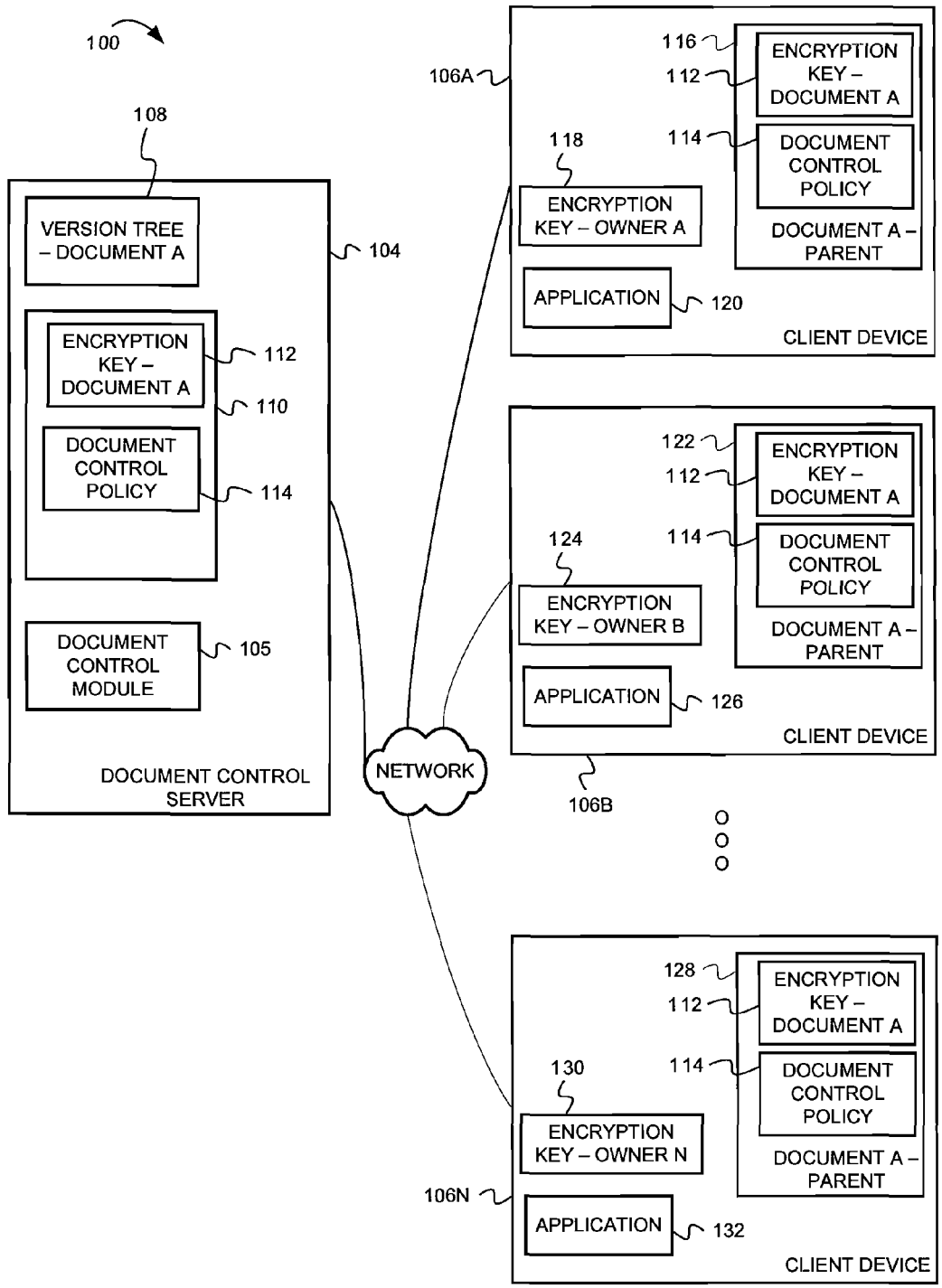
FIG. 1 is a network diagram of a system for performing versioning of modifiable encrypted documents, according to example embodiments.

Methods, apparatus and systems for performing versioning of modifiable encrypted documents are described. In the following description, numerous specific details are set forth. However, it is understood that embodiments of the invention may be practiced without these specific details. In other instances, structures and techniques have not been shown in detail in order not to obscure the understanding of this description.

As used herein, the term "a document control policy" may comprise a set of document control rules that may be applied to an electronic document. In example embodiments, the policy may be at least partially represented by a language such as the Portable Document Rights Language (PDRL), for example. PDRL, in at least one embodiment comprises a language that may be utilized for expressing the rights and conditions of a document control policy. Although PDRL may utilize one or more syntax formats, in at least one embodiment, PDRL may be expressed and/or represented in an Extensible Markup Language (XML). A document control policy may be associated with one or more electronic documents, and, as mentioned previously, may include a set of document control rules that may define rights associated with an electronic document, such as the right to access the electronic document by opening, editing, saving and/or printing the document, for example.

A document control policy may be associated with an electronic document by use of a license. A license may include identifying data for a user and/or an electronic document, and may associate an electronic document with a document control policy. A license may be granted to a user, and may associate the user with an electronic document, such that the user may perform functions with the electronic document in accordance with a policy. It may be desirable to enhance a document control policy to include additional data, such as a history of actions taken with the document, as one example. The additional data may further include archiving rules for an electronic document, and/or how and when the archiving rules were applied to the electronic document; indexing rules, metadata capture rules, and/or auditing rules, and/or how and when the rules were applied to the electronic document, to name a few examples. An enhanced document control policy such as this may provide a resource for determining how access to a particular electronic document is managed, and may additionally be utilized to audit the policy to determine whether particular rules were applied, how they were applied and/or when the rules may have been applied.

As used herein, the term "revocation", "revoke", "revoking", etc. may refer to any type of a reversible operation that precludes access to an electronic document. In some embodiments, the electronic document is encrypted with an encryption key. In some embodiments, if an electronic document that has been revoked, a server does not provide the encryption key to a client, regardless of the document control policy for the document. Accordingly, such client cannot open the electronic document. However, the encryption key remains stored on the server. Thus, the electronic document may be unrevoked so that subsequent requests for the encryption key may be honored (because the encryption key is not deleted).

As used herein, the term "shred", "shredding", etc. may refer to any type of irreversible operation that precludes access to an electronic document. The operation is considered irreversible because the copies of the encryption key (including those stored on a server) for opening the electronic document are deleted and cannot be reconstructed. Thus, the electronic document cannot be opened again.

As used herein, the term "client device" refers to any type of device that may execute a software application. The client device may be a thin client, fat client, or a hybrid client. For example, client devices may include desktop computer, notebook computers, wireless/wired devices, mobile devices (such as cellular telephones, Personal Digital Assistants (PDAs)), media players (such as MP-3 devices), gaming consoles, set-top boxes, etc.

As used herein, the term "encryption key" refers to any type and number of characters used by an encryption operation to encrypt data into encrypted data. The encryption keys may be symmetric or asymmetric. The encryption keys may be public or private. Examples of the type of encryption includes public key cryptography (such as Rivest, Shamir and Adleman (RSA), Diffie-Hellman, Digital Signature Algorithm (DSA), Fortezza, etc.). Another example of the type of encryption includes symmetric ciphers (such as Rivest Cipher (RC)2, RC4, International Data Encryption Algorithm (IDEA), Data Encryption Standard (DES), Triple DES, AES, Camellia, etc.

As used herein, the term "Digital Rights Management" (DRM) refers to any type of technology to protect digital content. In example embodiments, DRM is used to protect modifiable documents. In example embodiments, users of documents acquire a license in order to access the documents. Example embodiments incorporate various types of encryption for protection of the documents.

Example embodiments include an architecture for managing versioning of modifiable (editable) documents that are protected by some type of encryption. For example, in some embodiments, DRM may be used to protect the documents. Some embodiments track the different versions of a document. In example embodiments, a same encryption key is used for protection of the different versions of a document. In example embodiments, a given version is assigned a unique document identification. Further, a given version may maintain the identification of the parent document and the identification of the root document. Separate document identifications for the different versions enable the different versions to be separately identified. Moreover as further described later in this document, because versions maintain a parent identification and a root identification, a document control policy (e.g., revocation of the document) for versions of a document may be easily be updated.

Figure 2:
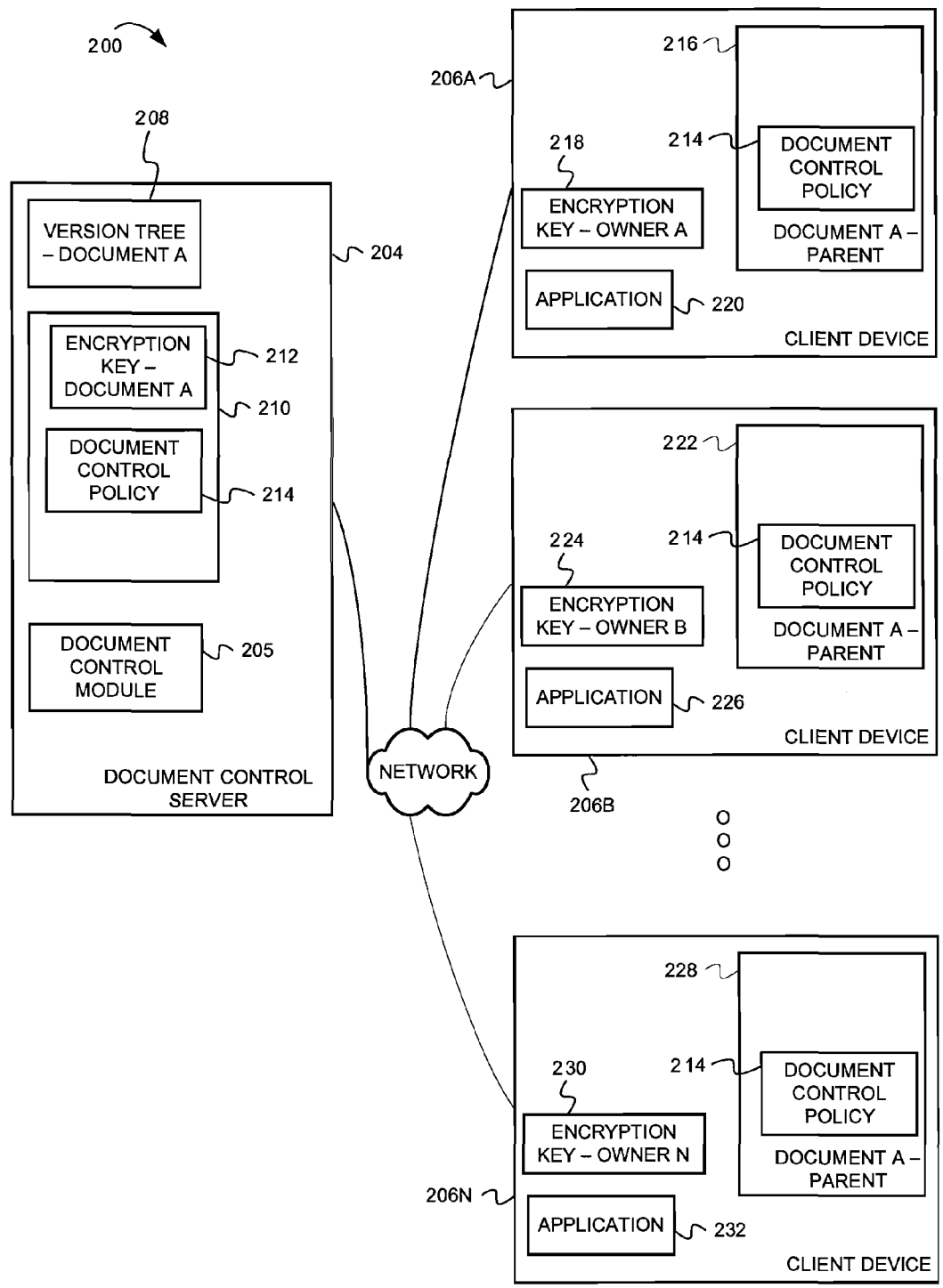
FIG. 2 is a network diagram of a system for performing versioning of modifiable encrypted documents, according to some other example embodiments.

Two systems configurations are now described. FIG. 1 illustrates a system wherein a shared encryption key for different versions of a document is distributed for storage on local client devices. FIG. 2 illustrates a system wherein this shared encryption key is only stored on a document control server. As further described later in this document, the system of FIG. 2 enables shredding of all versions of a document by deletion of the shared encryption key stored on the document control server.

Figure 3:
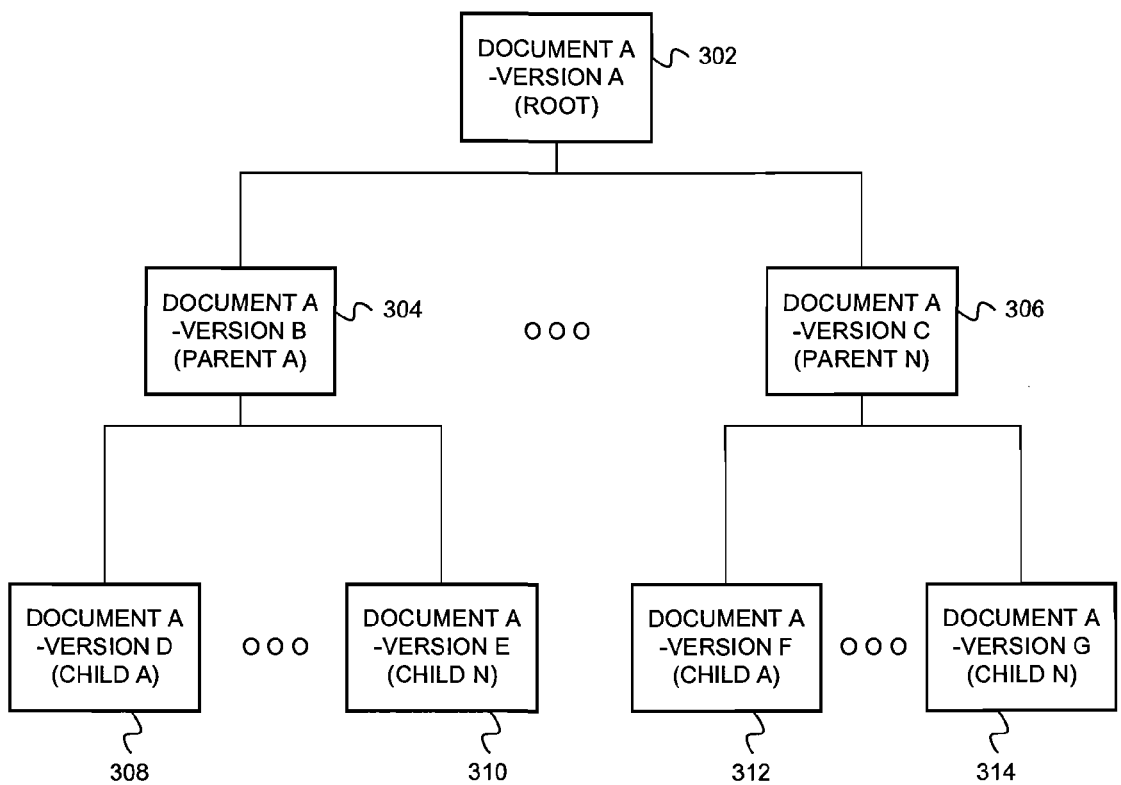
FIG. 3 illustrates a version tree for a document, according to example embodiments.

FIG. 1 is a network diagram of a system for performing versioning of modifiable encrypted documents, according to example embodiments. A system 100 comprises a network 102 that couples together one to a number of client devices 106A-106N and a document control server 104. The document control server 104 hosts a document control module 105 for controlling distribution of different versions of a document that may be encrypted. The document control module 105 may control the updates and distribution of the document control policy associated with a document. The document control server 104 comprises a machine-readable medium for storage of a document A 110 and a version tree 108 for the document A 110. For sake of clarity, FIG. 1 illustrates the storage one document (the document A 110) in the document control server 104. However, the document control server 104 may store one to any number of documents therein. The document control server 104 stores the document A 110 that includes an encryption key 112 and a document control policy 114 for document A. The encryption key 112 and the document control policy 114 may be stored in the metadata for the document. As further described later in this document, the encryption key 112 is used for encryption of the document A 110 and any versions thereof. The encryption key 112 may be used to encrypt the document A 110 on the document control server 104. Further, copies of the encryption key 112 may be distributed to the client devices 106 for encryption and decryption of the document A 110 (and versions thereof) on the client devices 106. As described above, the document control policy 112 may comprise a set of rules to provide document control for the document A 110. The document control server 104 also stores a version tree 108 for document A. The version tree 108 comprises a data structure that tracks the different versions and relationships (parent, child, sibling, etc.) among such versions for a given document. An example of the version tree 108 is illustrated in FIG. 3, which is described in more detail later in this document.

The client device 106A includes a machine-readable medium for storage of a copy of document A (parent) 116 and an encryption key 118 associated with an owner A. The document A 116 may be a copy or a version of the document A 112. The document A 116 includes a copy of the encryption key 112 and the document control policy 114. The encryption key 118 may be a key that is specific to a user that is editing the document A 116. The client device 106A also comprises an application 120 that may be used to edit the document A 116.

The client device 106B includes a machine-readable medium for storage of a copy of document A (version A) 122 and an encryption key 124 associated with an owner B. The document A (version A) 122 is a version of the document A (parent) 116. The document A (version A) 122 includes a copy of the encryption key 112 and the document control policy 114. The encryption key 124 may be a key that is specific to a user that is editing the document A (version A) 122. The client device 106B also comprises an application 126 that may be used to edit the document A (version A) 122. The owner A may transmit a copy of the document A (parent) 116 to the owner B. The owner B may modify and create a new version (version A). As shown, the encryption key 112 and the document control policy 114 are distributed with the document A (version A) 122.

The client device 106N includes a machine-readable medium for storage of a copy of document A (version N) 128 and an encryption key 130 associated with an owner N. The document A (version N) 128 is a version of the document A (parent) 116. The document A (version N) 128 includes a copy of the encryption key 112 and the document control policy 114. The encryption key 130 may be a key that is specific to a user that is editing the document A (version N) 128. The client device 106N also comprises an application 132 that may be used to edit the document A (version N) 128. The owner A may transmit a copy of the document A (parent) 116 to the owner N. The owner N may modify and create a new version (version N). As shown, the encryption key 112 and the document control policy 114 are distributed with the document A (version N) 128.

In some embodiments, each version of a document is assigned a unique document identification. Moreover, in some embodiments, each version is assigned a parent identification (which is the identification of the parent document for this version) and a root identification (which is the identification of the root document for this version). An example of the parent document and the root document relative to a given document is illustrated in FIG. 3, which is described in more detail later in this document. In some embodiments, the unique document identification, the parent identification and the root identification for a document are stored in the metadata for the document.

The system 100 may comprise any number of client devices 106. Further, multiple versions may be on a same client device 106 from the same or different owners. As shown, a same encryption key is used for encryption across the different versions of document A. While described such that the document and associated data are stored in a same server as the document control module 105. Alternatively or in addition, the location of the documents, associated data and document control module 105 may be distributed across any number of network storage devices/servers.

The network communication may be any combination of wired and wireless communication. In some embodiments, the network communication may be based on one or more communication protocols (e.g., HyperText Transfer Protocol (HTTP), HTTP Secured (HTTPS), etc.). While the system 100 shown in FIG. 1 employs a client-server architecture, embodiments are not limited to such an architecture, and could equally well find application in a distributed, or peer-to-peer, architecture system.

The document control module 105 and the application 120, 126 and 132 may be software, hardware, firmware or a combination thereof for executing operations, according to some embodiments. In some embodiments, the document control module 105 may host web pages or perform other services, such as one or more document control functions, for example. In some embodiments, the document control module 105 may be an Adobe® LifeCycle™ Policy Server, for example, and may be capable of implementing a document management policy for one or more resources, such as one or more electronic documents.

FIG. 2 is a network diagram of a system for performing versioning of modifiable encrypted documents, according to some other example embodiments. In particular, FIG. 2 illustrates a system 200, wherein the encryption key used across the different versions of a document is stored in a central repository. Copies of the encryption key are not distributed to the client devices.

A system 200 comprises a network 202 that couples together one to a number of client devices 206A-206N and a document control server 204. The document control server 204 hosts a document control module 205 for controlling distribution of different versions of a document that may be encrypted. The document control module 205 may control the updates and distribution of the document control policy associated with a document. The document control server 204 comprises a machine-readable medium for storage of a document A 210 and a version tree 208 for the document A 210. For sake of clarity, FIG. 2 illustrates the storage one document (the document A 210) in the document control server 204. However, the document control server 204 may store one to any number of documents therein. The document control server 204 stores the document A 210 that includes an encryption key 212 and a document control policy 214 for document A. The encryption key 212 and the document control policy 214 may be stored in the metadata for the document. As further described later in this document, the encryption key 212 is used for encryption of the document A 210 and any versions thereof. The encryption key 212 may be used to encrypt the document A 210 on the document control server 204. As described above, the document control policy 212 may comprise a set of rules to provide document control for the document A 210. The document control server 204 also stores a version tree 208 for document A. The version tree 208 comprises a data structure that tracks the different versions and relationships (parent, child, sibling, etc.) among such versions for a given document. An example of the version tree 208 is illustrated in FIG. 3, which is described in more detail later in this document.

The client device 206A comprises a machine-readable medium for storage of a copy of document A (parent) 216 and an encryption key 218 associated with an owner A. The document A 216 may be a copy or a version of the document A 212. The document A 216 includes a copy of the document control policy 214. The encryption key 218 may be a key that is specific to a user that is editing the document A 216. The client device 206A also comprises an application 220 that may be used to edit the document A 216.

The client device 206B comprises a machine-readable medium for storage of a copy of document A (version A) 222 and an encryption key 224 associated with an owner B. The document A (version A) 222 is a version of the document A (parent) 216. The document A (version A) 222 includes a copy of the document control policy 214. The encryption key 224 may be a key that is specific to a user that is editing the document A (version A) 222. The client device 206B also comprises an application 226 that may be used to edit the document A (version A) 222. The owner A may transmit a copy of the document A (parent) 216 to the owner B. The owner B may modify and create a new version (version A). As shown, the document control policy 214 is distributed with the document A (version A) 222.

The client device 206N comprises a machine-readable medium for storage of a copy of document A (version N) 228 and an encryption key 230 associated with an owner N. The document A (version N) 228 is a version of the document A (parent) 216. The document A (version N) 228 includes a copy of the document control policy 214. The encryption key 230 may be a key that is specific to a user that is editing the document A (version N) 228. The client device 206N also comprises an application 232 that may be used to edit the document A (version N) 228. The owner A may transmit a copy of the document A (parent) 216 to the owner N. The owner N may modify and create a new version (version N). As shown, the document control policy 214 are distributed with the document A (version N) 228.

In some embodiments, each version of a document is assigned a unique document identification. Moreover, in some embodiments, each version is assigned a parent identification (which is the identification of the parent document for this version) and a root identification (which is the identification of the root document for this version). An example of the parent document and the root document relative to a given document is illustrated in FIG. 3, which is described in more detail later in this document. In some embodiments, the unique document identification, the parent identification and the root identification for a document are stored in the metadata for the document.

The system 200 may comprise any number of client devices 206. Further, multiple versions may be on a same client device 206 from the same or different owners. As shown, a same encryption key is used for encryption across the different versions of document A. While described such that the document and associated data are stored in a same server as the document control module 205. Alternatively or in addition, the location of the documents, associated data and document control module 205 may be distributed across any number of network storage devices/servers.

The network communication may be any combination of wired and wireless communication. In some embodiments, the network communication may be based on one or more communication protocols (e.g., HyperText Transfer Protocol (HTTP), HTTP Secured (HTTPS), etc.). While the system 200 shown in FIG. 2 employs a client-server architecture, embodiments are not limited to such an architecture, and could equally well find application in a distributed, or peer-to-peer, architecture system.

The document control module 205 and the application 220, 226 and 232 may be software, hardware, firmware or a combination thereof for executing operations, according to some embodiments. In some embodiments, the document control module 205 may host web pages or perform other services, such as one or more document control functions, for example. In some embodiments, the document control module 205 may be an Adobe® LifeCycle™ Policy Server, for example, and may be capable of implementing a document management policy for one or more resources, such as one or more electronic documents.

FIG. 3 illustrates a version tree for a document, according to example embodiments. A version tree 300 is a data structure that tracks the different versions of a document and the relationships among the different versions. Version A 302 is the original document that is considered the root document. Version B 304 is a child of the version A 302 and is considered parent A (parent to a number of children documents) (described later in this document). Version C 306 is a child of the version A 302 and is considered parent N (parent to a number of children documents) (described later in this document). Version D 308 and version E 310 are children of the version B (parent A) 304. Version F 312 and version G 314 are children of the version C (parent B) 306. In some embodiments, a given version maintains a unique identification, an identification of its parent (parent identification) and an identification of the root (root identification). For example, version D 308 maintains a unique document identification, the identification of version B 304 (the parent identification) and the identification of version A 302 (the root identification).

Figure 4:
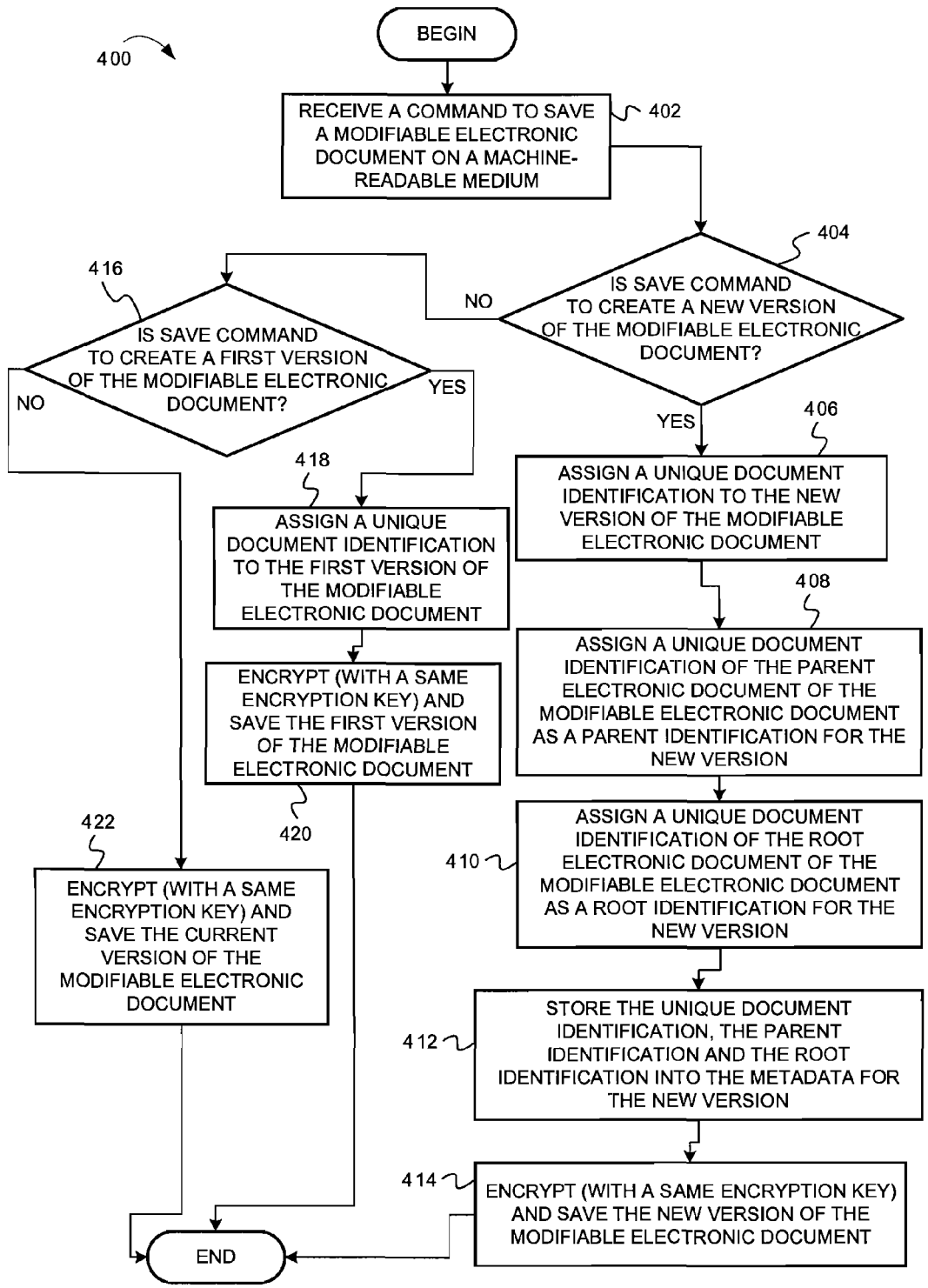
FIG. 4 is a diagram of a method for performing versioning of modifiable encrypted documents, according to example embodiments.

Operations, according to example embodiments, are now described. In certain embodiments, the operations are performed by instructions residing on machine-readable media (e.g., software), while in other embodiments, the methods are performed by hardware or other logic (e.g., digital logic). FIG. 4 is a diagram of a method for performing versioning of modifiable encrypted documents, according to example embodiments. In particular, a flow diagram 400 illustrates the operations wherein the encryption key for the different versions of a document is distributed to the local client devices. The flow diagram 400 is described with reference to FIGS. 1 and 3. In some embodiments, the flow diagram 400 is performed by the application 126. The operations of the flow diagram 400 may be performed by any application that edits documents. Alternatively or in addition, in example embodiments, the application 126 may be separate from the application performing the edits. The flow diagram 400 commences at block 402.

At block 402, the application 126 receives a command to save a modifiable electronic document onto a machine-readable medium. As further described later in this document, the command may perform different types of saves. For example, the command may be to save as a new document, a different version of a current document, a new document of a current document, etc. The flow continues at block 404.

At block 404, the application 126 determines whether the save command is to create a new version of the modifiable electronic document. This determination may be based on user input. With reference to FIG. 1, after modifying version A of the document, owner B of version A of this document may select an option on the type of save. For example, the options may include "save as a new version", "save as a new document", or "save as a same version." In response to a determination that the save command is to not create a new version, the flow continues at block 416 (which is described in more detail later in this document). Otherwise, the flow continues at block 406.

At block 406, the application 126 assigns a unique document identification to the new version of the modifiable electronic document. The document identification may be unique relative to other versions of the document. In some embodiments, the application 126 may request and receive the unique document identification from the document control module 105 on the document control server 104. The application 126 may also request and receive the identification from a different server/computer that is coupled to the network 102. The flow continues at block 408.

At block 408, the application 126 assigns the unique document identification of the parent of the document as the parent identification for the new version. In some embodiments, the parent identification is stored in the metadata of the parent document. Such metadata may be transmitted as part of the parent document to the client device 106B. For example, owner A (at client device 106A) may transmit (over the network 102) the parent document to owner B (at client device 106B). Using the application 126, owner B may edit the parent document and then perform a "save as a new version." Accordingly, the application 126 may extract the parent identification from the metadata of the parent document (which was sent by the owner A). The flow continues at block 410.

At block 410, the application 126 assigns the unique document identification of the root of the document as the root identification for the new version. In some embodiments, the root identification is stored in the metadata of the parent document. Such metadata may be transmitted as part of the parent document to the client device 106B. For example, owner A (at client device 106A) may transmit (over the network 102) the parent document to owner B (at client device 106B). Using the application 126, owner B may edit the parent document and then perform a "save as a new version." Accordingly, the application 126 may extract the root identification from the metadata of the parent document (which was sent by the owner A). The flow continues at block 412.

At block 412, the application 126 stores the unique document identification, the parent identification and the root identification into the metadata of the new version of the document. The flow continues at block 414.

At block 414, the application 126 encrypts and saves the new version of the modifiable electronic document. For the encryption, the application 126 uses the encrypted key shared across the different versions of the document (the encryption key 112). As shown, the encrypted key 112 is stored in the metadata for the parent document. The application 126 may encrypt the version A 122 and the metadata (that includes the encryption key 112 and the document control policy 114). In some embodiments, the application 126 may encrypt the version A 122 and the metadata (except for the encryption key 112) using the encryption key 112. Subsequently, the application 126 may encrypt the encryption key 112 using the encryption key 124 (associated with the owner B). The application 126 may then stored the encrypted version of the encrypted key 112 into the metadata for version A 122. The operations of the flow diagram 400 are complete (following this decision branch from the decision block 404).

At block 416 (if the save command is not to create a new version of the modifiable electronic document at decision block 404), the application 126 determines whether the save command is to create a first version of the modifiable electronic document. The first version may be considered the root document from which other versions branch. This determination may be based on user input. In response to a determination that the save command is to not create a first version of the document, the flow continues at block 422 (which is described in more detail later in this document). Otherwise, the flow continues at block 418. In particular, this branch of the flow diagram 400 is representative of a command to save wherein the document is saved for a first time (the root document).

At block 418, the application 126 assigns a unique document identification to the first version of the modifiable electronic document. The document identification may be unique relative to other subsequent versions of the document. In some embodiments, the application 126 may request and receive the unique document identification from the document control module 105 on the document control server 104. The application 126 may also request and receive the identification from a different server/computer that is coupled to the network 102. The flow continues at block 420.

At block 420, the application 126 encrypts and saves the first version of the modifiable electronic document. For the encryption, the application 126 uses the encrypted key that is to be shared across the different versions of the document (the encryption key 112). As shown, the encrypted key 112 is stored in the metadata. The application 126 may encrypt the version A 122 and the metadata (that includes the encryption key 112 and the document control policy 114). In some embodiments, the application 126 may encrypt the version A 122 and the metadata (except for the encryption key 112) using the encryption key 112. Subsequently, the application 126 may encrypt the encryption key 112 using the encryption key 124 (associated with the owner B). The application 126 may then stored the encrypted version of the encrypted key 112 into the metadata for version A 122. The operations of the flow diagram 400 are complete (following this decision branch from the decision block 416).

Returning to decision block 416, in response to a determination that the save command is to not create a first version of the document, the flow continues at block 422. In particular, this branch of the flow diagram 400 is representative of a command to save wherein the current version is resaved.

At block 422, the application 126 encrypts and saves the current version of the modifiable electronic document. For the encryption, the application 126 uses the encrypted key that is to be shared across the different versions of the document (the encryption key 112). As shown, the encrypted key 112 is stored in the metadata. The application 126 may encrypt the version A 122 and the metadata (that includes the encryption key 112 and the document control policy 114). In some embodiments, the application 126 may encrypt the version A 122 and the metadata (except for the encryption key 112) using the encryption key 112. Subsequently, the application 126 may encrypt the encryption key 112 using the encryption key 124 (associated with the owner B). The application 126 may then stored the encrypted version of the encrypted key 112 into the metadata for version A 122. The operations of the flow diagram 400 are complete (following this decision branch from the decision block 416).

Figure 5:
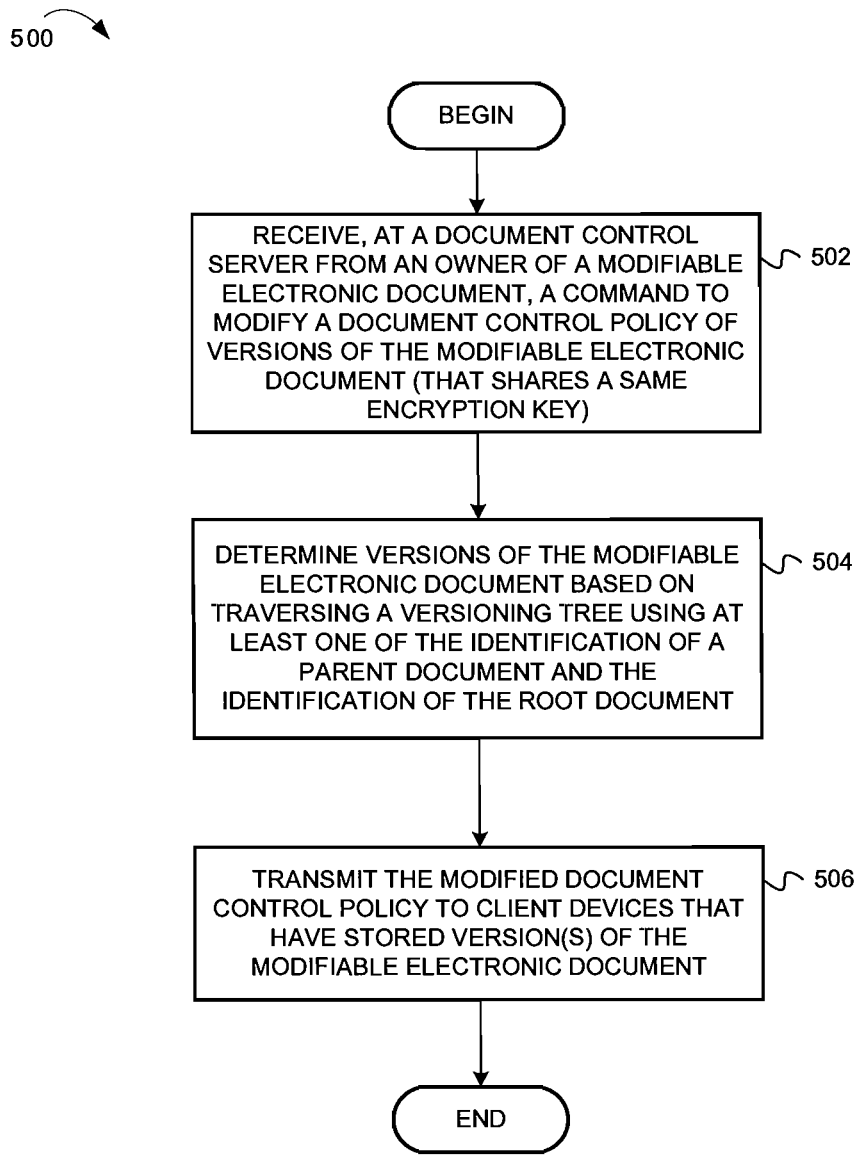
FIG. 5 is a diagram of a method for updating a document control policy of modifiable encrypted documents, according to example embodiments.

Operations, according to example embodiments, for updating a document control policy are now described. In certain embodiments, the operations are performed by instructions residing on machine-readable media (e.g., software), while in other embodiments, the methods are performed by hardware or other logic (e.g., digital logic). FIG. 5 is a diagram of a method for updating a document control policy of modifiable encrypted documents, according to example embodiments. The flow diagram 500 is described with reference to FIGS. 1 and 3. The operations of the flow diagram 500 may also be performed in the system 200 of FIG. 2. In some embodiments, the flow diagram 500 is performed by the document control module 105 of FIG. 1 or the document control module of FIG. 2. The flow diagram 500 commences at block 502.

At block 502, the document control module 105 receives, from an owner of a modifiable electronic document, a command to modify a document control policy of versions of the versions of the modifiable electronic document (that shares a same encryption key). In example embodiments, the owner of the modifiable electronic document is considered the one that created the root document. With reference to FIG. 1, the owner A could transmit a change in the document control policy for all versions of document A. The change could be received at the document control server 104. As described above, examples of modifications in the document control policy may include updates in rights to access the document. For example, the modification may revoke various levels of access, add different types of access, etc. The flow continues at block 504.

At block 504, the document control module 105 determines the versions of the modifiable electronic document. The document control module 105 may make this determination using at least one of the identification of the parent document and the identification of the root document. In some embodiments, the document control module 105 may traverse the versioning tree 108 to locate the different versions of the modifiable electronic document. The flow continues at block 506.

At block 506, the document control module 105 transmits the modified document control policy to the client devices that have stored version(s) of the modifiable electronic document. In some embodiments, the client devices 106 are required to periodically ping the document control server 104 to check for updates to document control policies for documents stored therein. In some embodiments, if the client devices 106 do not ping within given periods, the document is no longer accessible on the client devices 106. Accordingly, the document control module 105 may transmit the modified control policy to the client device 106 after the next ping. In some embodiments, the document control module 105 may transmit the modified policy after receiving the modification at the document control server 104. The operations of the flow diagram 500 are complete.

Figure 6:
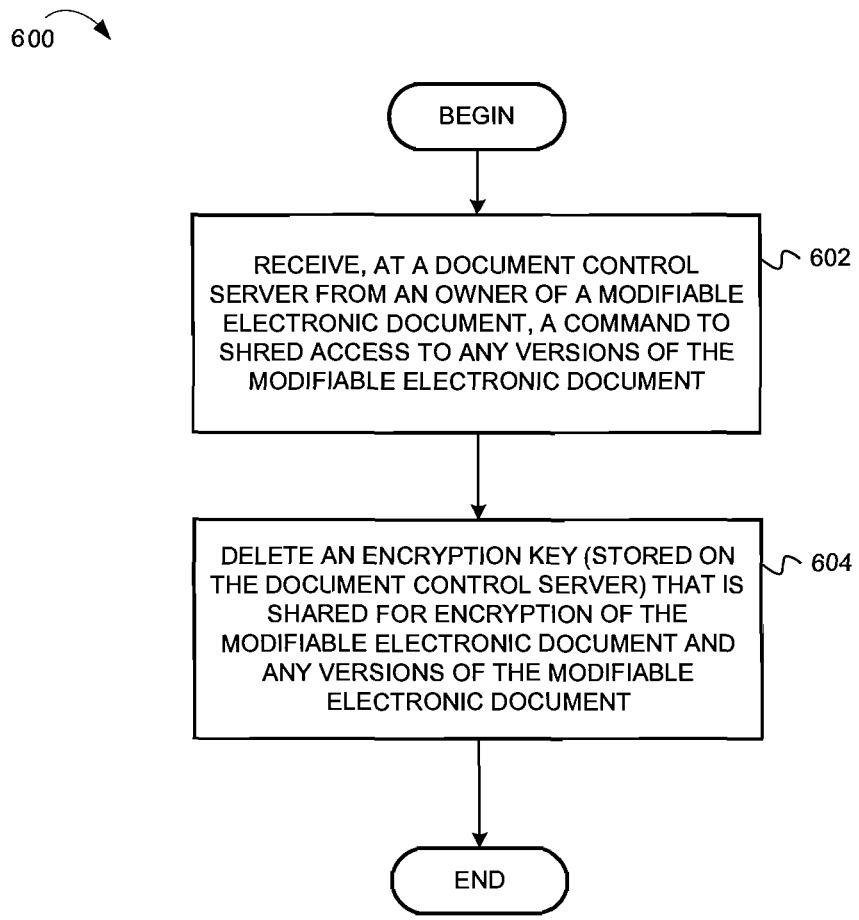
FIG. 6 is a diagram of a method for shredding access to modifiable encrypted documents, according to example embodiments.

Operations, according to example embodiments, for shredding access to a document are now described. In certain embodiments, the operations are performed by instructions residing on machine-readable media (e.g., software), while in other embodiments, the methods are performed by hardware or other logic (e.g., digital logic). FIG. 6 is a diagram of a method for shredding access to modifiable encrypted documents, according to example embodiments. The flow diagram 600 is described with reference to FIGS. 2 and 3. In some embodiments, the flow diagram 600 is performed by the document control module 205 of FIG. 2. The flow diagram 600 commences at block 602.

At block 602, the document control module 205 receives from an owner of a modifiable electronic document, a command to shred access to any versions of the modifiable electronic document. A command to shred is in effect deleting the document without requiring access to the document. Such documents may have been copied and stored on devices that may never connect to the document control server 104. For example, the client devices 106 may be taken offline to prevent changes in the document control policy. The flow continues at block 604.

At block 604, the document control module 205 deletes an encryption key (stored on the document control server 104) that is shared for encryption across the different versions of the modifiable electronic document. As described in reference to the system of FIG. 2, a copy of the shared encryption key is not stored on the client devices 106. Accordingly, after the encryption key is deleted from the document control server 104, the document can no longer be accessed. Thus, the document and any versions thereof are in effect deleted. The operations of the flow diagram 600 are complete.

Figure 7:
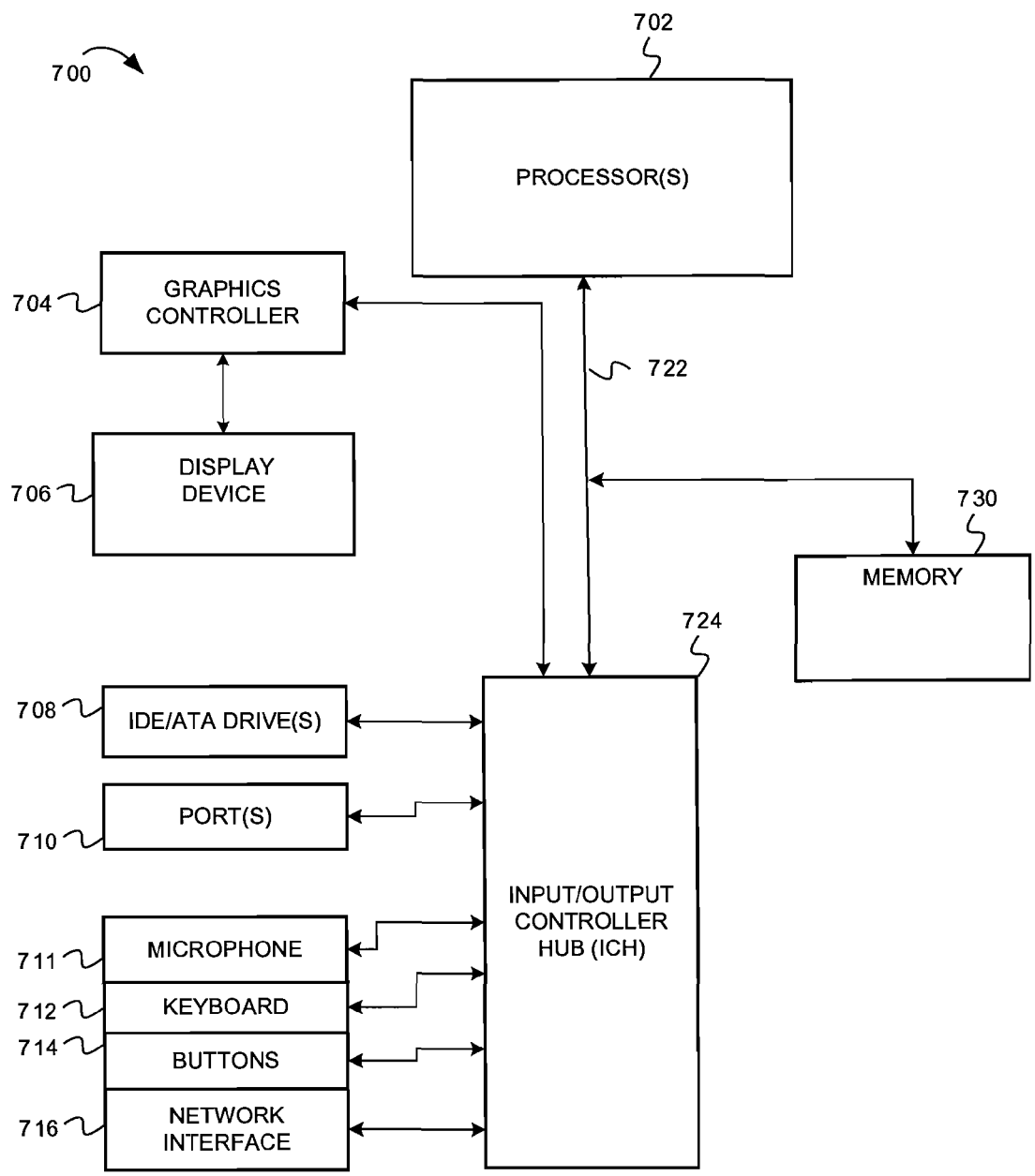
FIG. 7 illustrates a computer that may be used for versioning of modifiable electronic documents, according to example embodiments.

A detailed block diagram of an example computer environment, according to some embodiments, is now described. In particular, FIG. 7 illustrates a computer that may be used for versioning of modifiable electronic documents, according to example embodiments. A computer system 700 may be representative of one of the client devices, the servers, etc.

As illustrated in FIG. 7, the computer system 700 comprises processor(s) 702. The computer system 700 also includes a memory unit 730, processor bus 722, and Input/Output controller hub (ICH) 724. The processor(s) 702, memory unit 730, and ICH 724 are coupled to the processor bus 722. The processor(s) 702 may comprise any suitable processor architecture. The computer system 700 may comprise one, two, three, or more processors, any of which may execute a set of instructions in accordance with embodiments of the invention.

The memory unit 730 may store data and/or instructions, and may comprise any suitable memory, such as a dynamic random access memory (DRAM). The computer system 700 also includes IDE drive(s) 708 and/or other suitable storage devices. A graphics controller 704 controls the display of information on a display device 706, according to some embodiments of the invention.

The input/output controller hub (ICH) 724 provides an interface to I/O devices or peripheral components for the computer system 700. The ICH 724 may comprise any suitable interface controller to provide for any suitable communication link to the processor(s) 702, memory unit 730 and/or to any suitable device or component in communication with the ICH 724. For one embodiment of the invention, the ICH 724 provides suitable arbitration and buffering for each interface.

For some embodiments of the invention, the ICH 724 provides an interface to one or more suitable integrated drive electronics (IDE) drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, a mouse 714, a CD-ROM drive 718, one or more suitable devices through one or more firewire ports 716. For one embodiment of the invention, the ICH 724 also provides a network interface 720 though which the computer system 700 can communicate with other computers and/or devices.

In some embodiments, the computer system 700 includes a machine-readable medium that stores a set of instructions (e.g., software) embodying any one, or all, of the methodologies for described herein. Furthermore, software may reside, completely or at least partially, within memory unit 730 and/or within the processor(s) 702.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
receiving a modifiable electronic document, the modifiable electronic document comprising a first unique document identification;
generating a new version of the modifiable electronic document;
encrypting the new version of the modifiable electronic document using an encryption key that is used to encrypt the modifiable electronic document and different versions of the modifiable electronic document;
assigning a second unique document identification to the new version of the modifiable electronic document;

assigning the first unique document identification as a parent identification to the new version of the modifiable electronic document, the parent identification being the same as the first unique document identification;

assigning the document identification of a root document from which the different versions of the modifiable electronic document are created as a root identification for the new version; and saving the new version of the modifiable electronic document.

2. The method of claim 1, further comprising:

receiving an instruction, from an owner of the modifiable electronic document, to modify a document control policy for the modifiable electronic document and the new version, wherein the new version was identified using the second unique document identification and the parent identification; and updating the document control policy for the new version.

3. The method of claim 2, wherein updating the document control policy comprises revoking access to the new version of the modifiable electronic document.

4. The method of claim 1, further comprising:

receiving an instruction, from an owner of the root document, to modify a document control policy for one or more of the different versions of the modifiable electronic document, wherein the new version was identified using the second unique document identification, the parent identification and the root identification; and updating the document control policy for the new version.

5. The method of claim 4, wherein updating the document control policy comprises revoking access to the new version of the modifiable electronic document.

6. The method of claim 4, updating the document control policy comprises adding an access right to one or more of the different versions of the modifiable electronic document.

7. A method comprising:

receiving, at a document control server from an owner of a modifiable electronic document, a command to modify a document control policy of at least one version of the modifiable electronic document, wherein the modifiable electronic document and the at least one version are encrypted using a same encryption key, wherein the modifiable electronic document and the at least one version each comprise a unique document identification, an identification of a parent document and an identification of a root document;

and transmitting the modified document control policy to a number of client devices that have stored the at least one version of the modifiable electronic document.

8. The method of claim 7, further comprising traversing a version tree for the modifiable electronic document, using at least one of the identification of the parent document and the identification of the root document, the traversing of the version tree to determine the at least one version of the modifiable electronic document.

9. The method of claim 7, wherein a command to modify the document control policy comprises a revocation of the modifiable electronic document and at least one version of the modifiable electronic document.

10. A non-transitory machine-readable medium including instructions which when executed by a machine causes the machine to perform operations comprising:

receiving a command to save a modifiable electronic document;

performing the following operations in response to a determination that the modifiable electronic document is a new version of a parent electronic document, assigning unique document identification to the modifiable electronic document;

assigning, to the modifiable electronic document, a unique document identification of the parent electronic document as a parent identification; and assigning, to the modifiable electronic document, a root identification of a version tree to which the modifiable electronic document and the parent electronic document are within;

encrypting the modifiable electronic document using an encryption key that is used to encrypt the parent electronic document; and saving the modifiable electronic document.

11. The machine-readable medium of claim 10, further comprising storing the unique document identification, the parent identification and the root identification as part of metadata for the modifiable electronic document.

12. The machine-readable medium of claim 10, further comprising encrypting the modifiable electronic document with the same encryption key.

13. The machine-readable medium of claim 10, further comprising revoking access to the modifiable electronic document and any versions of the modifiable electronic document based on a revocation from an owner of an electronic document that is direct ancestor of the modifiable electronic document.

14. The machine-readable medium of claim 12, further comprising modifying a document control policy of the modifiable electronic document based on a modification of the document control policy by an owner of an electronic document that is an ancestor of the modifiable electronic document.

15. A non-transitory machine readable medium including instructions which when executed by a machine causes the machine, to perform operations comprising:

receiving, at a document control server from an owner of a modifiable electronic document, a command to shred access to any versions of the modifiable electronic document, wherein the modifiable electronic document and any versions are encrypted using a same encryption key, wherein the modifiable electronic document and the at least one version each comprise a unique document identification, an identification of a parent document and an identification of a root document; and deleting the same encryption key that is stored at a location from a group consisting of the document control server and a centralized storage location.

16. The machine-readable medium of claim 15, wherein the same encryption key is not stored in client devices that store the modifiable electronic document and any versions of the modifiable electronic document.

17. The machine-readable medium of claim 15, wherein the modifiable electronic, document and any versions of the modifiable electronic document are only accessible using the same encryption key.

18. The machine-readable medium of claim 15, wherein any versions of the modifiable electronic document are stored on at least one client device and wherein a copy of the same encryption key is not stored on the at least one client device.

19. A server comprising:

a machine-readable medium to store a version tree to track versions of a modifiable electronic document and a shared encryption key that is used to encrypt versions of the modifiable electronic document;

and a document control module executed on a hardware processor to control access to the modifiable electronic document and versions of the modifiable electronic document, wherein the document control module is to receive a command to modify a document control policy from an owner of the modifiable electronic document, the document control module to traverse the version tree to locate versions of the modifiable electronic document, wherein the document control module is to transmit the modified document control policy to a number of client devices that have stored at least one version of the modifiable electronic document, and wherein metadata for versions of a modifiable electronic document comprise an identification of the version of the modifiable electronic document, an identification of a parent of the version of the modifiable electronic document and an identification of a root document of the version tree.

20. The server of claim 19, wherein the document control module is to traverse the version tree using at least one of the identification of the parent of the modifiable electronic document and the identification of the root document of the version tree.

21. The server of claim 19, wherein the modified document control policy comprises a revocation of access to versions of the modifiable electronic document.

22. The server of claim 19, wherein the modified document control policy comprises an addition of an access right to versions of the modifiable electronic document.

* * * * *